(12) United States Patent
Sekiyama

(10) Patent No.: US 6,526,350 B2
(45) Date of Patent: Feb. 25, 2003

(54) ROUTE GUIDE APPARATUS AND GUIDANCE METHOD

(75) Inventor: Hiroaki Sekiyama, Shinagawa-ku (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/988,049

(22) Filed: Nov. 16, 2001

(65) Prior Publication Data

US 2002/0065604 A1 May 30, 2002

(30) Foreign Application Priority Data

Nov. 30, 2000 (JP) ........................................ 2000-364619

(51) Int. Cl.[7] ............................................... G01C 21/30
(52) U.S. Cl. ...................... 701/209; 701/201; 701/211; 701/212; 340/995
(58) Field of Search ................................ 701/201, 202, 701/204, 208, 209, 211, 212; 340/988, 990, 995

(56) References Cited

U.S. PATENT DOCUMENTS 6,128,571 A * 10/2000 Ito et al. ...................... 701/201

* cited by examiner

Primary Examiner—Gertrude Arthur
(74) Attorney, Agent, or Firm—Oliff & Berridge, PLC.

(57) ABSTRACT

A route guide apparatus and method finds a route to a destination and supplies the route to a user terminal. The apparatus stores information regarding facilities which are landmarks, searches for a route that reaches the destination and that passes near at least one of the facilities which is a landmark, and supplies the route to a user terminal. The route guidance apparatus and method may further store advertisement information. In that case, preferably a search is made for a route that passes near the facility which is a landmark and whose advertisement information is to be supplied to the user. This enables advertisers to supply advertisement information to the user when the user passes near the landmark facility.

28 Claims, 4 Drawing Sheets

FIG. 2

| FACILITY | POSITION | ADVERTISEMENT INFORMATION |
|----------|----------|---------------------------|
| AA | P1 | AVAILABLE |
| BB | P2 | UNAVAILABLE |
| CC | P3 | UNAVAILABLE |
| DD | P4 | AVAILABLE |

ROUTE GUIDE APPARATUS AND GUIDANCE METHOD

INCORPORATION BY REFERENCE

The disclosure of Japanese Patent Application No. 2000-364619 filed on Nov. 30, 2000, including the specification, drawings and abstract, is incorporated herein by reference in its entirety.

BACKGROUND OF THE INVENTION

1. Field of Invention

The invention relates to route guide apparatus and methods. More particularly, the invention relates to route guidance in which a user's fashion of moving is taken into consideration.

2. Description of Related Art

There is a conventionally known vehicle navigation system that searches for a route from a present position to a destination input by a driver of the vehicle by using a Dijkstra's algorithm or the like, and displays a found route on a display device so as to guide the driver to the destination. More specifically, the system displays map data on the display screen, and detects the present position of the vehicle and displays the present position on the map data in a superimposed manner, and indicates a found route on the map data by an arrow or outputs voice guidance for the route so as to guide the driver to the destination. If a facility or the like exists along a guide route, the navigation system appropriately displays information regarding the facility for convenience of the driver.

Along with widespread use of mobile appliances, including cellular phones, personal digital assistants (PDA), etc., systems which supply a user of such a mobile appliance with information regarding a route to a destination have been proposed. For example, technology developed for users of PHS® (personal handyphone system) detects an approximate present position of a PHS phone, and finds a route from the present position to a destination, and transmits route data to the PHS phone.

However, routes found by ordinary vehicular route finding algorithms are not necessarily appropriate for users who desire to move on foot to their destinations instead of using vehicles. That is, when on foot, a user can choose a pedestrian path or a narrow road that people usually do not use when moving by vehicle. Despite this fact, the conventional vehicular route finding algorithms do not present such narrow roads or pedestrian paths as guide routes. Another problem is that the conventional technology cannot guide a user in such a reliable manner that even when in a relatively complicated road situation, the user will not lose one's way.

SUMMARY OF THE INVENTION

Accordingly, it is an object of the invention to provide an apparatus and a method capable of finding appropriate routes not only for users moving by vehicle but also for users moving on foot, and of effectively supplying a user moving to a destination with advertisement information.

In order to achieve the aforementioned and/or other objects, one aspect of the invention provides a route guide apparatus for finding a route to a destination and supplying the route to a user terminal. The apparatus stores information regarding facilities which are landmarks, searches for a route that reaches the destination and that passes near at least one of the facilities which are landmarks, and supplies the route to a user terminal.

Furthermore, in order to achieve the aforementioned and/or other objects, another aspect of the invention provides a route guidance method of a route guide apparatus for finding a route to a destination and supplying the route to a user terminal, the method including: receiving a user setting of the destination; searching for a route that reaches the destination and that passes near at least one of the facilities which are landmarks for the user, and supplying the route to the user.

According to the route guide apparatus and method, a route that passes near a facility (including a route that passes through the facility) which is a landmark can be found, and can be supplied to the user terminal. Therefore, the user can reach the destination without fail, based on the landmark. The "facility which is a landmark" in the invention does not need to stand out among the surrounding buildings and the like, but may also be a facility that is relatively easy for a user moving along a road to visually recognize.

The route guidance method of the invention may further include storing advertisement information, wherein the method searches for a route that passes near at least one facility which is a landmark and whose advertisement information is to be supplied to the user. Furthermore, in accordance with the invention, a route guidance method may include: receiving a setting of the destination from the user; searching for a route that reaches the destination and that passes near at least one facility which is a landmark for the user and whose advertisement information is to be supplied to the user; and supplying the route to the user.

Therefore, it becomes possible to supply facility-related advertisement information to a user besides presenting a route that is easy for the user to understand.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which:

FIG. 2 shows data stored in a facility information server in the first embodiment;

DETAILED DESCRIPTION OF PREFERRED EMBODIMENTS

In the following description and the accompanying drawings, the present invention will be described in more detail with reference to exemplary, preferred embodiments.

Figure 1:
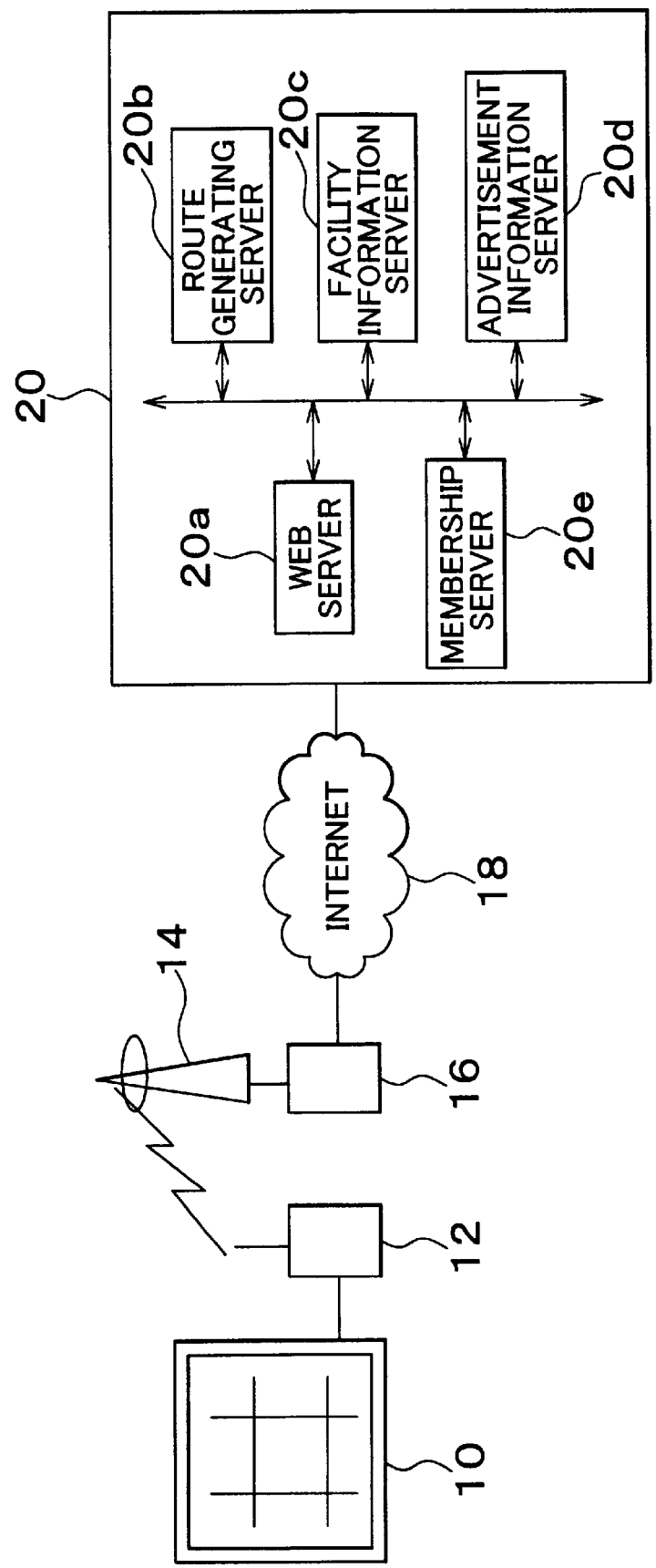
FIG. 1 is a diagram illustrating an overall construction of a first embodiment of the invention.

A first embodiment of the invention will be described with reference to the accompanying drawings. FIG. 1 is a diagram illustrating an overall construction of the embodiment. A user carries a mobile terminal 10, such as a cellular phone, a PDA (personal digital assistant), etc. Via a communication terminal 12 connected to the mobile terminal 10, the user can conduct voice communications or data communications with a wireless base station 14. Preferably, the mobile terminal 10 has a display portion, such as a liquid crystal display, a CRT (cathode-ray tube), etc. The wireless base station 14 is connected to an Internet 18 via an Internet gateway 16. The Internet 18 is connected to a server 20. The wireless base station 14 detects the present position of the user from the intensity of radio waves transmitted from the communication terminal 12 and the like, and supplies a destination input by the user using the mobile terminal 10 to the server 20 via the Internet gateway 16 and the Internet 18.

The server 20 has a web server 20a, a route generating server 20b, a facility information server 20c, an advertisement information server 20d, and a membership server 20e. The web server 20a stores various web pages, and transmits web pages to the mobile terminal 10 of the user in accordance with access from the user.

On the basis of the present position of the user and the destination information supplied from the wireless base station 14, the route generating server 20b finds a route from the present position to the destination, and transmits the route to the mobile terminal 10 of the user. The route generating server 20b finds a route from the present position to the destination basically by using a cost-minimizing algorithm such as the Dijkstra's algorithm or the like. However, unlike the conventional art, the route generating server 20b does not merely search for a minimum-distance or minimum-time route from the present position to the destination, but searches for a route that is easy for the user to understand, taking into account the user moving on foot as well. The route easy for the user to understand means, for example, a route that passes near a facility which is a landmark. When informed of such a route, the user can reach the destination without making a mistake, even if the route is in a complicated road situation, by using such a landmark facility as a guidance indication. Data regarding the facilities that are considered to be landmarks is stored in the facility information server 20c. The route generating server 20b executes a route search by reading facility data from the facility information server 20c.

The facility information server 20c stores data regarding the facilities that are landmarks for the user, that is, the locations, names and the like of the facilities. Examples of the facilities that are considered to be landmarks include shops, such as convenience stores, department stores, shopping centers, rental video shops, etc., public facilities, theaters, movie theaters, broadcasting facilities, amusement facilities, etc. Facilities that are considered to be landmarks may be determined based on not only the size or scale thereof but also the degree of name recognition as in the case of famous restaurants and the like.

The advertisement information server 20d stores advertisement information supplied from advertisers. If a user requests supply of advertisement information, advertisement information is read from the advertisement information server 20d, and is transmitted to the user. Advertisement information may be supplied when the user passes near a facility related to the advertisement information. Therefore, if a user requests supply of advertisement information, the route generating server 20b does not merely find a route that passes near a facility which is a landmark, but finds a route that passes near a facility which is a landmark and whose advertisement information is to be supplied, and supplies the route to the user. For example, in a case where a convenience store and a movie theater exist as facilities that are landmarks and where advertisement information related to a movie that is currently shown at the movie theater is supplied, the route generating server 20b finds a route that passes near the movie theater, not the convenience store. Specifically, this operation can be accomplished in the following manner. That is, the presence and absence of advertisement information is stored as facility data in the facility information server 20c (e.g., a flag is set). If a user requests advertisement information, the route generating server 20b extracts facilities having advertisement information from the facility data stored in the facility information server 20c, and then finds an appropriate route.

FIG. 2 schematically shows data stored in the facility information server 20c. That is, the facility information server 20c stores not only the names and IDs of facilities, but also the position data and the presence and absence of advertisement information regarding the facilities.

The membership server 20e stores personal data regarding the users of the route guidance services of the apparatus. Specifically, the membership server 20e stores the billing information regarding the users as well as the names and IDs of the users. In an example of one billing method, the usage charge is reduced if a user requests supply of advertisement information than if the user does not request advertisement information. When the user passes near a facility, which is a landmark and whose advertisement information is to be supplied to the user, the membership server 20e stores a record of the passage of the user.

Figure 3:
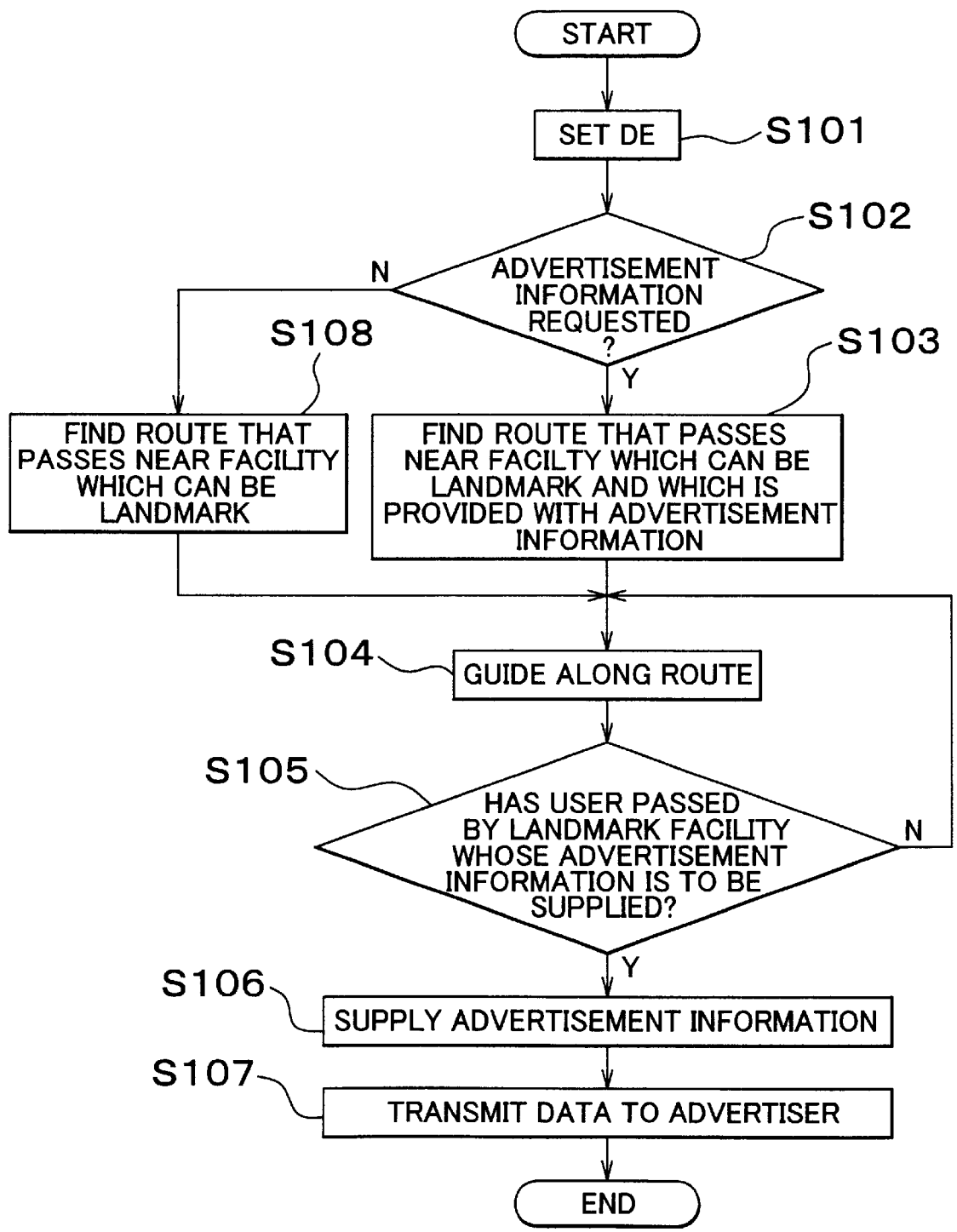
FIG. 3 is a flowchart illustrating an overall operation in the first embodiment.

FIG. 3 is a flowchart illustrating an overall operation in the first embodiment. First, the user sets a destination using the mobile terminal 10 (S101). The thus-set destination is supplied to the server 20 via the wireless base station 14, the Internet gateway 16 and the Internet 18. Next, the user selects whether to request the supply of advertisement information using the mobile terminal 10. Specifically, the server 20 causes the mobile terminal 10 to display a selection screen. On the selection screen, the user selects whether to request the supply of advertisement information. Data regarding the selection of the user is supplied to the server 20. Then, the server 20 determines whether the user has requested the supply of advertisement information (S102). If the user requests the supply of advertisement information, the route generating server 20b finds a route that passes near a facility which is a landmark and whose advertisement information is to be supplied (S103).

Figure 4:
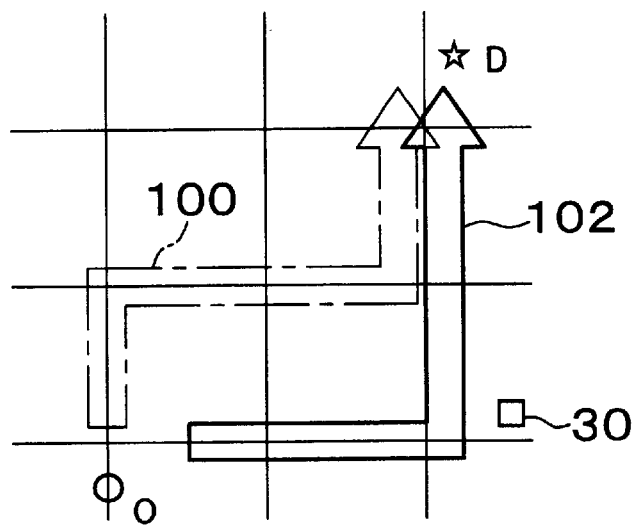
FIG. 4 is a diagram illustrating a route finding operation in the first embodiment.

FIG. 4 indicates a route found by the route generating server 20b in this embodiment. Referring to FIG. 4, among the possible routes from the present position O of the user to a destination D, a route 102 is found as a route that passes near a facility 30 which is a landmark and whose advertisement information is to be supplied. In FIG. 4, a route 100 from the present position O to the destination D that is found according to the conventional art is also indicated. According to the conventional art, the route 100 is obtained by searching for a shortest route from the present position O to the destination D through the use of the Dijkstra's algorithm or the like. However, the route 100 is not necessarily appropriate to reliably guide the user to the destination D if the user is moving on foot. In contrast, the route 102 is easy for the user to follow because the landmark exists along the route 102. In order to find a route that passes near a facility which is a landmark and whose advertisement information is to be supplied, it is appropriate to set as a transit point a facility which is a landmark and whose advertisement information is to be supplied, and to find a route from the present position O to the transit point and a route from the transit point to the destination D by the Dijkstra's algorithm or the like.

Referring back to FIG. 3, after finding the route that passes near a facility which is a landmark and whose advertisement information is to be supplied, the server 20 transmits the route to the mobile terminal 10 of the user via the Internet 18, the Internet gateway 16 and the wireless base station 14. The mobile terminal 10 of the user displays in the display portion the route data received from the wireless base station 14, thereby guiding the user (S104).

The user moves along the route based on the results of route search displayed on the display portion of the mobile terminal 10. While the user is moving, the present position of the user is detected from, for example, the positional relationship between the mobile terminal 10 and the wireless base station 14, and is transmitted to the server 20. Then, the server 20 determines whether the user has actually passed near the facility which can be a landmark and whose advertisement information is to be supplied (S105). If the user has actually passed near the facility, the server 20 reads the advertisement information from the advertisement information server 20d, and transmits it to the mobile terminal 10 of the user via the Internet 18 and the wireless base station 14 (S106).

From the viewpoint of the user, the advertisement information related to a facility is automatically displayed on the user's mobile terminal 10 when the user passes by the facility. Therefore, the user obtains useful information related to a facility located on the route to the destination D.

After providing the user with the advertisement information, the server 20 stores the information that the user passed near the facility with the advertisement information supplied to the user, as a record of passage into the membership server 20e. The server 20 also notifies the advertiser that the advertisement information was supplied to the user upon the user's passage near the facility, via the Internet 18 and the like (S107). Therefore, the advertiser can acquire knowledge that the advertisement information was supplied to the user. The server 20 may also supply the advertisers with the records of passage stored in the membership server 20e, that is, the number of users to which the advertisement information was supplied, data regarding the attributes of the users (ages, occupations, etc.), and the like.

Furthermore, after supplying advertisement information to the user, the server 20 may transmit the billing data (advertisement charge) to the advertiser.

If the determination in step S102 is negative (NO), that is, if the user does not request the supply of advertisement information, the server 20 finds a route that passes near a facility which is a landmark, and transmits the route to the mobile terminal 10 of the user (S108). Specifically, the server 20 extracts any facility that is a landmark regardless of whether advertisement information is provided for the facility, and accordingly finds an appropriate route. Then, the user moves to the destination D following the route displayed in the display portion. In this case, when the user passes near a facility that is a landmark, no advertisement information is supplied to the user because the determination in step S105 is negative ("NO").

Thus, according to the embodiment, the server 20 does not necessarily find a minimum-distance or minimum-time route to a destination, but finds a route that passes near a facility which is a landmark, unlike the conventional art. Therefore, the embodiment makes it possible even for a user moving on foot to reach a desired destination without fail, that is, without losing one's way. Furthermore, if the user requests the supply of advertisement information, the user can obtain advertisement information related to a facility simultaneously with the user's passage in the vicinity of the facility. Thus, the user can obtain useful information while moving. Still further, this is an advantage to advertisers as well. That is, the user can be guided to a facility related to an advertiser, and can be supplied with the advertisement.

In the foregoing embodiment, the present position of the user is detected from the positional relationship with the wireless base station 14, which receives radio waves transmitted from the mobile terminal 10 of the user. However, it is also possible to provide the mobile terminal 10 with a GPS (global positioning system) or a DGPS, for example. In that case, the mobile terminal 10 transmits the detected present position to the wireless base station 14.

Furthermore, it is also possible for the user to set an arbitrary location different from the present position of the user as a starting point by using the mobile terminal 10, and to transmit the starting point to the wireless base station 14. For example, a nearby railroad station or a public facility may be set as a starting point. In that case, the server 20 may regard the starting point input by the user as the present position of the user (the starting point may be regarded as a future present position because the user reaches the starting point at a certain time point in the future) when searching for a route to the destination.

While in the first embodiment, a route that passes a facility which is a landmark and whose advertisement information is to be supplied is found, a second embodiment described below is a route guide apparatus and method suitable to find a route in a case where there are a plurality of facilities which are landmarks and whose advertisement information is to be supplied.

Figure 5:
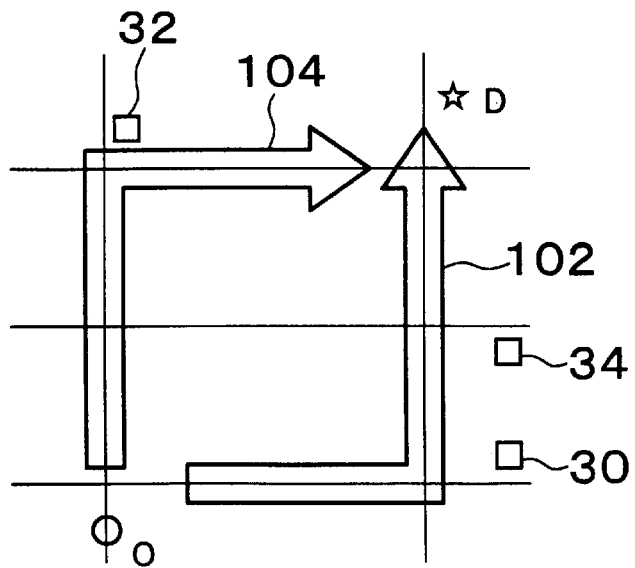
FIG. 5 is a diagram illustrating a route finding operation in a second embodiment.

In the second embodiment, a route is selected based on the number of facilities or the significance or weight thereof. FIG. 5 indicates such a case. That is, if there are a plurality of facilities which are landmarks and whose advertisement information is to be supplied, the route generating server 20b is able to find a route that passes near more facilities. In FIG. 5, a route 102 passes near facilities 30, 34 whereas a route 104 passes near a facility 32. Therefore, the server 20 selects the route 102, and transmits the route 102 to the mobile terminal 10 of the user. It is also possible to provide the facilities with weights corresponding to their significances and select a route with a maximum weight from possible routes. For example, if the facilities 30, 34 have less weights and the facility 32 has a greater weight, the server 20 may select the route 104 that passes near the facility 32 with the greater weight regardless of the number of transit facilities. Furthermore, if there are a plurality of routes that pass near facilities, it is also preferable to supply some or all of the routes to a user and let the user select a route.

Still further, if there are a plurality of facilities which can be landmarks and whose advertisement information is to be supplied, it is also possible to select a route based on the user's personal data stored in the membership server 20e, for example, the user's age or sex. For example, if a user is relatively young in age, it is possible to select a route that passes near a facility provided with advertisement information that is considered suitable for people of that age. That is, a plurality of facilities may be classified into different ranks based on the user's personal data. It is also possible to analyze the user's record of passage stored in the membership server 20e and select a route based on a result of that analysis. For example, if there is no record of passage of a user with regard to a facility, it is determined that the facility is useless as a landmark or an advertisement facility for the user, the routes passing near that facility are excluded from the route selection. Furthermore, if it is desired on the side of a facility that advertisement information be actively supplied, a high priority may be given to the facility in the server 20 on the condition that the facility side pay an increased advertisement fee. In that case, a route that passes near such a high-priority facility is more likely to be selected.

Still further, if there is a route that passes near a facility but that is an inconveniently long-distance detour, the route may be canceled. Specifically, it is appropriate to set an upper limit for the distance of the route from a present position to a destination and find a route that passes near a facility within the upper limit. An upper limit may be provided for the estimated travel time instead of the travel distance. It is also preferable to raise the upper limit in accordance with the significance of a facility as a landmark or the significance of the advertisement information regarding the facility.

Although in the first and second embodiments, the facilities that can be landmarks are pre-set on the apparatus side, and are stored in the facility information server 20c, it is also possible to allow a user to select a desired genre of facilities as landmarks and to find a route by the route generating server 20b searching the data regarding the facilities of the selected genre stored in the facility information server 20c. For example, the genre may be restaurants (or types of restaurants), tourist attractions, parks, types of stores, etc.

Furthermore, although the first and second embodiments have been described on the assumption that the user moves on foot, the invention is not limited by those embodiments, but may also be suitably applied to a case where the user moves by using a vehicle (a motor vehicle, a bicycle or the like). In that regard, the user terminal may be mounted in the vehicle, rather than being a hand-held device.

In a still further example in accordance with the invention, a moving measure of a user is detected by a certain method (e.g., by monitoring the moving speed of the user). If the user is expected to move on foot, a route that passes near a facility which is a landmark is found. If the user is expected to move by using a vehicle, a minimum-distance route is found.

Thus, as is apparent from the description of the first and second embodiments, the invention makes it possible to reliably guide a user to a destination regardless of the moving measure of the user. Furthermore, it is possible to supply a user with useful information, such as advertisement information related to a specific facility, along the route to the destination.

A controller (the server 20) of the illustrated embodiment is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A route guide apparatus for finding a route to a destination and supplying the route to a user terminal, comprising:

landmark storage means for storing information regarding facilities which are landmarks;

route search means for searching for a route that reaches the destination and that passes near at least one of the facilities which are landmarks;

route supplying means for supplying the route found by the route search means to the user terminal; and advertisement storage means for storing advertisement information regarding at least some of the facilities that are landmarks, wherein the route search means searches for a route that passes near at least one of the facilities which is a landmark and whose advertisement information is to be supplied to the user terminal and if there are a plurality of facilities which are landmarks and whose advertisement information is to be supplied to the user terminal, the route search means searches for a route based on a weight assigned to each facility in accordance with a significance of each facility.

2. The route guide apparatus according to claim 1, further comprising:

present position detecting means for detecting a present position of the user terminal; and advertisement supplying means for supplying the advertisement information of a particular facility to the user terminal when a user of the user terminal passes near the particular facility.

3. The route guide apparatus according to claim 2, further comprising passage information supplying means for supplying passage data to an advertiser of the advertisement information if the user has passed near the particular facility.

4. The route guide apparatus according to claim 2, further comprising billing information generating means for generating billing information for an advertiser of the advertisement information in accordance with whether the user has passed near the particular facility.

5. The route guide apparatus according to claim 1, further comprising membership information storage means for storing membership information of a user of the route guide apparatus, wherein the route search means searches for a route that passes near at least one facility whose advertisement information is considered suitable for the user based on the user's stored membership information.

6. A route guide apparatus for finding a route to a destination and supplying the route to a user terminal, comprising:

present position detecting means for detecting a present position of the user terminal;

landmark storage means for storing information regarding facilities which are landmarks;

route search means for searching for a route that reaches the destination and that passes near at least one of the facilities which are landmarks;

route supplying means for supplying the route found by the route search means to the user terminal;

advertisement storage means for storing advertisement information regarding at least some of the facilities that are landmarks; and advertisement supplying means for supplying the advertisement information of a particular facility to the user terminal when a user of the user terminal passes near the particular facility, wherein the route search means searches for a route that passes near at least one of the facilities which is a landmark and whose advertisement information is to be supplied to the user terminal and the route search means searches for a route that passes near more facilities if there are a plurality of facilities which are landmarks and whose advertisement information is to be supplied to the user terminal.

7. The route guide apparatus according to claim 6, further comprising passage information supplying means for supplying passage data to an advertiser of the advertisement information if the user has passed near the particular facility.

8. The route guide apparatus according to claim 6, further comprising billing information generating means for generating billing information for an advertiser of the advertisement information in accordance with whether the user has passed near the particular facility.

9. The route guide apparatus according to claim 6, further comprising membership information storage means for storing membership information of a user of the route guide apparatus, wherein the route search means searches for a route that passes near at least one facility whose advertisement information is considered suitable for the user based on the user's stored membership information.

10. A route guide apparatus for finding a route to a destination and supplying the route to a user terminal, comprising:

landmark storage means for storing information regarding facilities which are landmarks;

present position detecting means for detecting a present position of the user terminal;

route search means for searching for a route that reaches the destination and that passes near at least one of the facilities which are landmarks;

route supplying means for supplying the route found by the route search means to the user terminal;

advertisement storage means for storing advertisement information regarding at least some of the facilities that are landmarks;

advertisement supplying means for supplying the advertisement information of a particular facility to the user terminal when a user of the user terminal passes near the particular facility; and passage information supplying means for supplying passage data to an advertiser of the advertisement information if the user has passed near the particular facility, wherein the route search means searches for a route that passes near at least one of the facilities which is a landmark and whose advertisement information is to be supplied to the user terminal.

11. The route guide apparatus according to claim 10, further comprising membership information storage means for storing membership information of a user of the route guide apparatus, wherein the route search means searches for a route that passes near at least one facility whose advertisement information is considered suitable for the user based on the user's stored membership information.

12. A route guide apparatus for finding a route to a destination and supplying the route to a user terminal, comprising:

landmark storage means for storing information regarding facilities which are landmarks;

present position detecting means for detecting a present position of the user terminal;

route search means for searching for a route that reaches the destination and that passes near at least one of the facilities which are landmarks;

route supplying means for supplying the route found by the route search means to the user terminal;

advertisement storage means for storing advertisement information regarding at least some of the facilities that are landmarks;

advertisement supplying means for supplying the advertisement information of a particular facility to the user terminal when a user of the user terminal passes near the particular facility; and billing information generating means for generating billing information for an advertiser of the advertisement information in accordance with whether the user has passed near the particular facility, wherein the route search means searches for a route that passes near at least one of the facilities which is a landmark and whose advertisement information is to be supplied to the user terminal.

13. The route guide apparatus according to claim 12, further comprising membership information storage means for storing membership information of a user of the route guide apparatus, wherein the route search means searches for a route that passes near at least one facility whose advertisement information is considered suitable for the user based on the user's stored membership information.

14. A route guide apparatus for finding a route to a destination and supplying the route to a user terminal, comprising:

landmark storage means for storing information regarding facilities which are landmarks;

route search means for searching for a route that reaches the destination and that passes near at least one of the facilities which are landmarks;

route supplying means for supplying the route found by the route search means to the user terminal;

advertisement storage means for storing advertisement information regarding at least some of the facilities that are landmarks; and advertisement acquisition selecting means for inputting selection data supplied from the user terminal regarding whether to acquire the advertisement information, wherein the route search means searches for a route that passes near at least one of the facilities which is a landmark and whose advertisement information is to be supplied to the user terminal and if acquisition of the advertisement information is selected, the route search means searches for a route that passes near at least one facility which is a landmark and whose advertisement information is to be supplied to the user terminal.

15. The route guide apparatus according to claim 14, further comprising usage charge information generating means for generating information regarding usage charge to a user having the user terminal in accordance with whether a selection was made to acquire the advertisement information.

16. The route guide apparatus according to claim 14, wherein if there are a plurality of facilities which are landmarks and whose advertisement information is to be supplied to the user terminal, the route search means searches for a route based on a weight assigned to each facility in accordance with a significance of each facility.

17. The route guide apparatus according to claim 14, wherein the route search means searches for a route that passes near more facilities if there are a plurality of facilities which are landmarks and whose advertisement information is to be supplied to the user terminal.

18. The route guide apparatus according to claim 14, further comprising:

present position detecting means for detecting a present position of the user terminal; and advertisement supplying means for supplying the advertisement information of a particular facility to the user terminal when a user of the user terminal passes near the particular facility.

19. The route guide apparatus according to claim 14, further comprising membership information storage means for storing membership information of a user of the route guide apparatus, wherein the route search means searches for a route that passes near at least one facility whose advertisement information is considered suitable for the user based on the user's stored membership information.

20. A route guidance method of a route guide apparatus for finding a route to a destination and supplying the route to a user terminal, comprising:

receiving a user set destination;

searching for a route that reaches the destination and that passes near at least one facility that is stored in a database of landmarks and whose advertisement information is to be supplied to the user; and supplying the route to the user terminal, wherein if there are a plurality of facilities which are landmarks and whose advertisement information is to be supplied to the user terminal, searching for a route is based on a weight assigned to each facility in accordance with a significance of the facility.

21. The route guidance method according to claim 20, further comprising storing membership information of a user, and wherein the step of searching for a route comprises searching for a route that passes near at least one facility whose advertisement information is considered suitable for the user based on the user's stored membership information.

22. A route guidance method of a route guide apparatus for finding a route to a destination and supplying the route to a user terminal, comprising:

receiving a user set destination;

searching for a route that reaches the destination and that passes near at least one facility that is stored in a database of landmarks and whose advertisement information is to be supplied to the user;

supplying the route to the user terminal; and supplying the advertisement information of a particular facility to the user terminal when the user passes near the particular facility.

23. The route guidance method according to claim 22, further comprising supplying passage data to an advertiser of the advertisement information if the user has passed near the particular facility.

24. The route guidance method according to claim 22, further comprising generating billing information for an advertiser of the advertisement information in accordance with whether the user has passed near the particular facility.

25. The route guidance method according to claim 22, further comprising storing membership information of a user, and wherein the step of searching for a route comprises searching for a route that passes near at least one facility whose advertisement information is considered suitable for the user based on the user's stored membership information.

26. A route guidance method of a route guide apparatus for finding a route to a destination and supplying the route to a user terminal, comprising:

receiving a user set destination;

searching for a route that reaches the destination and that passes near at least one facility that is stored in a database of landmarks and whose advertisement information is to be supplied to the user;

supplying the route to the user terminal; and determining whether the user selected whether to acquire the advertisement information, wherein only if acquisition of the advertisement information by the user is selected, a route that passes near a facility which is a landmark and whose advertisement information is to be supplied to the user terminal is searched for.

27. The route guidance method according to claim 26, further comprising generating information regarding usage charge to the user in accordance with whether the user selected to acquire the advertisement information.

28. The route guidance method according to claim 26, further comprising storing membership information of a user, and wherein the step of searching for a route comprises searching for a route that passes near at least one facility whose advertisement information is considered suitable for the user based on the user's stored membership information.

* * * * *